UNITED STATES PATENT OFFICE.

DAVID ALLISTON LEGG, OF LONDON, ENGLAND, ASSIGNOR TO MATTHEW ATKINSON ADAM, OF LONDON, ENGLAND.

COPPER CATALYST.

1,401,117. Specification of Letters Patent. Patented Dec. 20, 1921.

No Drawing. Application filed October 24, 1921. Serial No. 510,097.

*To all whom it may concern:*

Be it known that I, DAVID ALLISTON LEGG, a subject of the King of Great Britain and Ireland, and residing at 17 Pepys road, Raynes Park, London, S. W. 19, England, have invented certain new and useful Improvements in and Relating to Copper Catalysts, of which the following is a specification.

This invention relates to the production of bodies containing copper in the form of an oxid or substantially metallic copper produced by reduction of the aforesaid bodies for use as catalysts in processes in which bodies of such composition can function as catalyzers.

A copper or copper containing catalyst is frequently used as an oxidizing or dehydrogenating catalyst in the process of catalytic oxidation or dehydrogenation of alcohols, for example, or of other bodies capable of such oxidation or dehydrogenation, the substance being passed over the copper catalyst heated to a suitable temperature with or without the admixture of air.

Various forms of copper catalyst have been proposed or used including:—

(a) Powdered copper oxid usually black oxid substantially reduced either alone or on an inert carrier such as pumice;

(b) Copper deposited from solutions of its salts on an inert carrier;

(c) Copper gauze, and (d) Copper oxid obtained by oxidizing metallic copper at high temperatures.

Objections to these forms of catalyst fall under the following headings which are applicable to some or all of the above-mentioned forms.

(a) Poor heat conductor;
(b) Unstable and of variable activity;
(c) Lack of coherence;
(d) Difficulty of preparation;
(e) Difficulty of reactivating or recovering the catalyst in a commercially salable form.

The object of my invention is to provide a copper or copper containing catalyst free of these disadvantages.

This invention consists in a method of producing a catalyst containing copper in the form of an oxid according to which cupric oxid or a salt which may produce cupric oxid on heating is fused by raising to the fusing temperature of cupric oxid, cooled and broken into pieces.

This invention also consists in a method of producing a catalyst of or containing copper in metallic form according to which cupric oxid or a salt which may produce cupric oxid on heating (*e. g.*, copper nitrate, or carbonate) is fused by raising to the fusing temperature of cupric oxid, cooled and partially or completely reduced and broken into pieces.

The invention also consists in the products prepared from the above processes.

In carrying the invention into effect in one form by way of example, we employ a furnace such as an ordinary reverberatory furnace with a hearth, say, 14 inches by 12 inches lined with fireclay cement impervious to fused copper oxid. The hearth is heated, for example, by a direct blow pipe gas flame to about 1100° C., say from three gas blow pipes. A charge of 15 lbs. of copper oxid either granular or powdered is placed on the hearth and heated in the direct flame for about 15 minutes, being raked over meanwhile. At the end of this time the fused spongy mass is removed, cooled and broken into lumps of suitable size and these can directly be used as catalysts, even in sizes, say, of 1 inch cubes.

The fusion may be carried out if desired in an electric or other type of furnace capable of working at the desired temperature.

If desired, the mass after cooling may be reduced in a current of hydrogen before use or this reduction may be omitted.

The mass has been referred to as a spongy mass, but these words do not bear quite their usual significance, because although to a certain extent spongy as regards sometimes form and sometimes porosity, the mass is more of the nature both in density and porosity of a hard brick. The porosity of the fused oxid is probably due to bubbles of oxygen which are produced on heating the copper oxid to the melting point. Since most of the oxygen may escape before the substance solidifies the mass is not necessarily very porous. Whatever be the theory of the action the body produced is more accurately regarded as a dense heat conducting substance rather than a voluminous non-conducting substance. After reduction in a current of hydrogen or during a process of dehydrogenation the mass apparently becomes more porous possibly because it is gradually reduced throughout. Reduction appears hardly ever to be complete and it is found that both the fused oxid and the reduced fused oxid will act as dehydrogenating or oxidizing catalyst.

A catalyst made as described above tested on the dehydrogenation of secondary butyl alcohol is found to give many times the efficiency of other catalysts and in the particular experiments in question the catalyst gave ten times the efficiency of the catalyst comprising the copper oxid from which it was prepared. By efficiency we mean the quantity of material converted for a given volume of catalyst, that is to say, in the example referred to above, on filling a tube with black copper oxid (mixed with water to a paste, dried and broken into lumps) and a tube of similar dimensions with a fused copper catalyst prepared as described above in lumps of about the same size, we found that we could pass the secondary butyl alcohol vapor at about 10 times the velocity through the second tube than through the first to obtain the same percentage conversion. By starting with a non-active copper oxid powder this can be converted into an active copper oxid by fusion and contrary to expectations the use of ordinary gas in the blow pipes does not poison the catalyst during fusion. By fusing ordinary commercial or other forms of copper oxid granular or powdered at a suitable temperature, cooling the product and breaking it into lumps, a catalyst is obtained which with or without preliminary reduction with hydrogen is of great activity in bringing about oxidation or dehydrogenation at suitable temperatures. Moreover, it possesses none of the above-mentioned disadvantages and its activity is independent of the physical condition, activity or fine chemical qualities of the original copper oxid. Further, catalysts can be provided which are good conductors of heat, are stable and of substantially constant activity, are coherent, are comparatively simple and cheap to prepare and present little difficulty in reactivating or recovering in a commercially salable form.

Having now described my invention, what I claim as new and desire to secure by Letters Patent is:—

1. A method of producing a catalyst containing copper in the form of an oxid according to which cupric oxid is fused by raising to the fusing temperature of cupric oxid, cooled and broken into pieces.

2. A method of producing a catalyst which consists in reducing at least in part the copper oxid prepared by the method claimed in claim 1.

3. The use of cupric oxid fused into a spongy mass as a catalyst.

4. The use of fused and crushed cupric oxid as a catalyst.

In testimony whereof I have signed my name to this specification.

DAVID ALLISTON LEGG.